United States Patent
Hendel

(10) Patent No.: US 7,295,565 B2
(45) Date of Patent: Nov. 13, 2007

(54) SYSTEM AND METHOD FOR SHARING A RESOURCE AMONG MULTIPLE QUEUES

(75) Inventor: Ariel Hendel, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1051 days.

(21) Appl. No.: 10/328,470

(22) Filed: Dec. 24, 2002

(65) Prior Publication Data
US 2004/0120332 A1 Jun. 24, 2004

(51) Int. Cl.
*H04L 12/56* (2006.01)
(52) U.S. Cl. .................. 370/413; 370/395.42; 370/429
(58) Field of Classification Search ................ 370/414, 370/415, 416, 417, 418
See application file for complete search history.

(56) References Cited

U.S. PATENT DOCUMENTS

| | | | | |
|---|---|---|---|---|
| 5,016,161 A * | 5/1991 | Van Loo et al. ............. 718/108 |
| 5,313,454 A * | 5/1994 | Bustini et al. ............... 370/231 |
| 6,069,893 A * | 5/2000 | Parruck et al. ........ 370/395.42 |
| 6,141,344 A * | 10/2000 | DeLong ....................... 370/360 |
| 6,295,295 B1 * | 9/2001 | Wicklund .................... 370/392 |
| 6,556,578 B1 * | 4/2003 | Silberschatz et al. ....... 370/412 |
| 6,687,247 B1 * | 2/2004 | Wilford et al. ............. 370/392 |
| 6,731,644 B1 * | 5/2004 | Epps et al. .................. 370/412 |
| 6,934,255 B1 * | 8/2005 | Toporek et al. ............. 370/235 |
| 6,950,396 B2 * | 9/2005 | Assa et al. ................ 370/230.1 |
| 6,985,455 B1 * | 1/2006 | Heath et al. ................. 370/316 |
| 7,145,869 B1 * | 12/2006 | Kadambi et al. ........... 370/229 |
| 7,236,490 B2 * | 6/2007 | Chang et al. ................ 370/392 |
| 2001/0048690 A1 * | 12/2001 | Magill et al. ............... 370/415 |
| 2002/0039368 A1 * | 4/2002 | Musoll et al. .............. 370/412 |
| 2004/0114616 A1 * | 6/2004 | Wang .......................... 370/412 |
| 2006/0031374 A1 * | 2/2006 | Lu et al. ..................... 709/207 |

* cited by examiner

*Primary Examiner*—Chi Pham
*Assistant Examiner*—Kevin Mew
(74) *Attorney, Agent, or Firm*—Park, Vaughan & Fleming LLP

(57) ABSTRACT

A system and method for sharing a resource (e.g., buffers) among multiple queues (e.g., InfiniBand send queues). Each queue has a local context indicating the Current amount of the resource allocated to the queue, the Minimum it is guaranteed, and a Maximum amount. A context may also include one or more pointers for managing the queue. Global Available and Reserve values indicate, respectively, the amount of the resource not currently allocated and the amount of the resource being reserved to guarantee each queue its Minimum. When an element is posted to a queue, a Full signal is raised for every queue to prevent further activity while the global values and the affected queue's context are updated. Then, if Available>0, the signal is de-asserted for any queue for which Current<Minimum or, if Available>Reserve, for any queue for which Current<Maximum.

42 Claims, 7 Drawing Sheets

WQE Buffer Pool 402

Free List 406

Context 408

Allocated List 404

SYSTEM AND METHOD FOR SHARING A RESOURCE AMONG MULTIPLE QUEUES

BACKGROUND

This invention relates to the field of computer systems. More particularly, a system and methods are provided for sharing resources among transmission queues, such as InfiniBand send queues.

In many computing environments, a communication interface (e.g., a network interface card, a channel adapter) maintains multiple queues for transmitting packets, cells, frames or other communications. The queues may be designed to store the communications from the time they are generated or submitted for transmission, until they are acknowledged by their recipients. Because they are colocated on a single communication interface, resources of the interface (e.g., memory) must be shared or allocated among the queues.

Existing methods of managing a resource shared among transmission queues are often inefficient. For example, allocating all queues sufficient memory to accommodate a maximum expected level of traffic, while considering maximum latencies, is impractical due to the cost. Further, if the queues share a common outbound communication link, they cannot all transmit simultaneously on the full link bandwidth, and therefore do not all need a level of resources corresponding to use of the full bandwidth.

In addition, when a transmission queue receives different types of communications for transmission (e.g., different sizes, different content), an existing method of allocating resources to the queue may allow a source or type of communication to be starved. For example, sufficient memory may be allocated to a queue to repeatedly accommodate small communications, but not enough to accommodate a large communication.

Thus, what is needed is a system and method for sharing a resource (e.g., memory) among multiple transmission queues in an efficient manner, while preventing starvation.

SUMMARY

In one embodiment of the invention, a system and method are provided for sharing a resource (e.g., memory buffers) among multiple queues (e.g., InfiniBand send queues). Each queue has a local context indicating a Current amount of the resource allocated to the queue, the Minimum it is guaranteed (regardless of other queues' allocations), and the Maximum that can be allocated (regardless of other queues' allocations). Global "Available" and "Reserve" values indicate, respectively, the amount of the resource not currently allocated to any queue, and the amount of the resource that must be reserved to guarantee each queue its Minimum.

In this embodiment, when an element is posted to or retired from a queue, a Full signal is raised for every queue to prevent further activity while the global values and the affected queue's context are updated. Then, if Available>0, the Full signal is de-asserted for any queue for which Current<Minimum or, if Available>Reserve, for any queue for which Current<Maximum.

A queue's local context may also include one or more pointers for managing the queue. In one embodiment, a write pointer may be used to identify the tail of the queue, a first read pointer may identify the next element to be scheduled and a second read pointer may identify the next element to be retired.

In one embodiment of the invention, the Full signal remains asserted for any queue that is at its Maximum size, and is de-asserted as described above. In one alternative embodiment, the Full signal may indicate a number of new elements a queue may accept (or the number of buffers that may be allocated to the queue) without exceeding its Maximum size. In this embodiment, Full is asserted as described above to indicate the queue can be allocated zero additional buffers. When de-asserted, the signal may be modified to indicate that it can accept a particular number of buffers (e.g., one, two) or a number of buffers large enough to accept any transaction (e.g., a transaction or series of transactions requiring three or more buffers).

DETAILED DESCRIPTION

Figure 1:
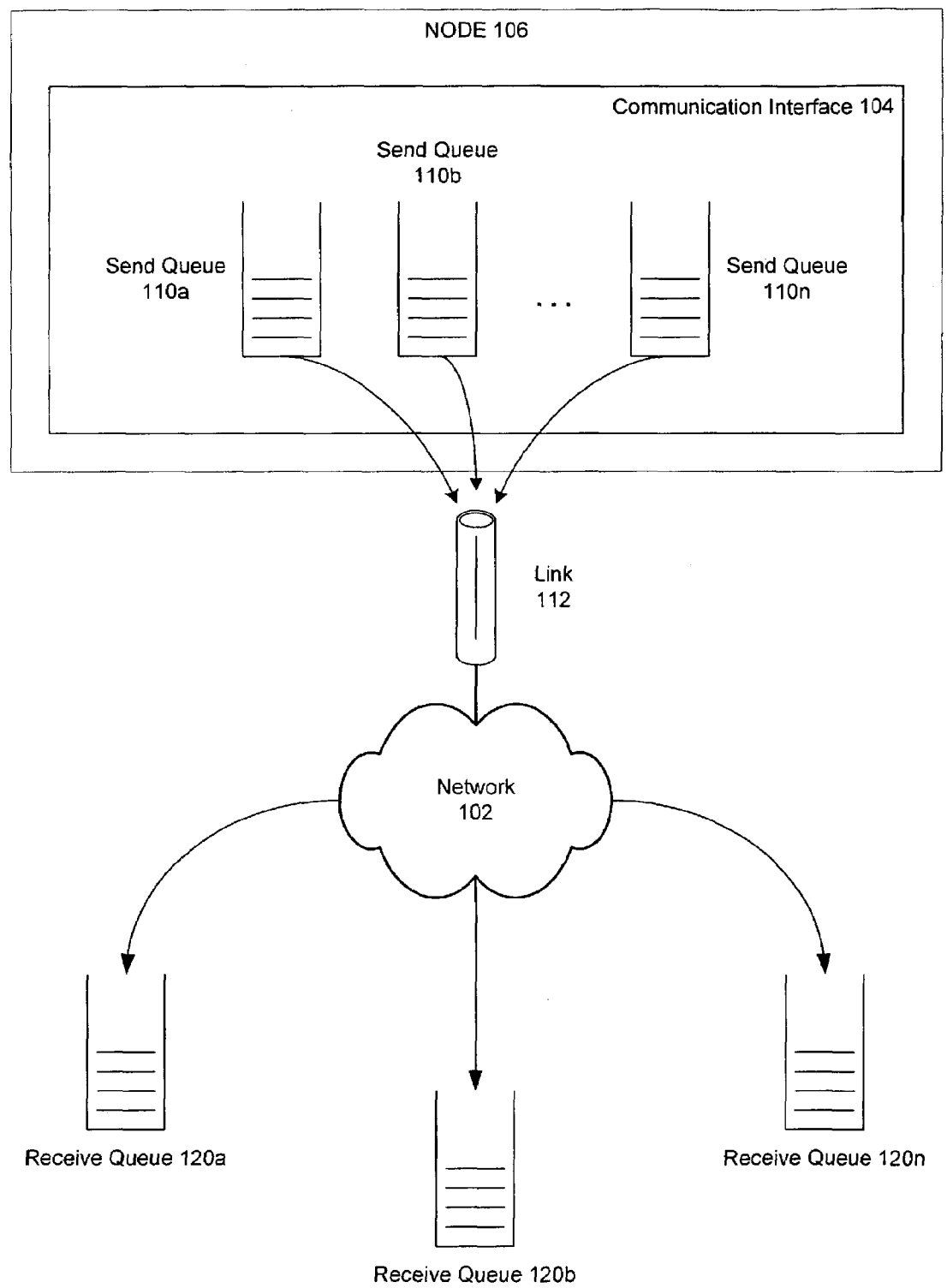
FIG. 1 is a block diagram depicting a communication environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates an InfiniBand host or target, a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In an embodiment of the invention, a system and method are provided for efficiently sharing a resource (e.g., memory) among multiple transmission queues, while avoiding the starvation of any communication or communication source.

One or more embodiments of the invention are described herein as they may be implemented in an InfiniBand host or target, or a channel adapter of a host or target. Embodiments suitable for other communication environments may be adapted from these descriptions without exceeding the scope of the invention.

The InfiniBand architecture employs a message model for communications, wherein message queues are dedicated to input/output connections between two endpoints (e.g., a host and a target). Message queues are endowed with transport functionality of the operative protocol stack, thereby obviating the need for extensive message handling by an operating system kernel.

InfiniBand send queues are used to temporarily store work queue elements (WQE) for processing, including packetization and transmission. A work queue element may comprise or represent any type of communication initiated by an InfiniBand node, such as encapsulated control messages and data messages, RDMA (Remote Direct Memory Access) data and request messages, etc. When a send queue is configured for a reliable connection, a WQE is generally retired from the send queue only after it is acknowledged by the receiving endpoint.

Thus, an InfiniBand send queue may store WQEs from the time they are created by a source or submitted for transmission, until they are retired in response to a recipient's acknowledgement. InfiniBand send queues feed high capacity communication links, which often have relatively high latencies due to long round-trip times, switching or routing delays, response times, and so on. Thus, send queues must be afforded sufficient resources to accommodate long latencies and support reliable connections.

FIG. 1 depicts a communication environment in which an embodiment of the invention may be implemented. In FIG. 1, communication interface or channel adapter 104 of InfiniBand node 106 includes multiple send queues 110a, 110b, . . . 110n for queuing communications for transmission across shared link 112 and network 102. Network 102 may comprise an InfiniBand fabric and/or a packet-switched network such as the Internet.

Node 106 may be a computer system, input/output system or other node configured to transmit communications over network 102. Send queues 110a, 110b, . . . 110n store information in the form of Work Queue Elements (WQE). As the queues are serviced, the information is directed to receive queues 120a, 120b . . . 120n in other nodes. Each receive queue may be maintained by a communication interface or channel adapter at a separate network node or endpoint (e.g., computer system, input/output subsystem), or more than one of the receive queues may be located at one endpoint.

Illustratively, in an InfiniBand implementation of this embodiment, all contents of a particular send queue of communication interface 104 of node 106 are directed to one receive queue of another endpoint. In addition, for each of send queues 110a, 110b, . . . 110n, the communication interface maintains a receive queue (not shown in FIG. 1) for receiving communications from a corresponding send queue of the other endpoint (not shown in FIG. 1). Together, an associated send queue and receive queue constitute a Queue Pair (QP) for handling a connection with another entity, and cooperate to form a reliable connection (RC).

Each send queue may be assigned a different logical channel (e.g., virtual lane), or more than one of the queues may be assigned the same logical channel. In one embodiment, the number of send queues (e.g., 128) exceeds the number of logical channels (e.g., 4). However, all transmissions from send queues 110a, 110b, . . . 110n traverse communication link 112.

Network 102 may include any number of communication links and devices (e.g., switches, routers), which may be shared by virtually any number of end-to-end connections through the network. The paths used by nodes communicating with node 106, the amount of traffic on those paths, and the nodes' turnaround times all contribute to the wide variation of roundtrip latencies observed by the send queues of communication interface 104.

In a method of dynamically allocating shared resources among transmission queues in an embodiment of the invention, several factors are considered and addressed. For example, allowances are made for traffic burstiness, the termination of different queues in different fault domains, and the variation among the queues regarding traffic levels, latencies, etc. Thus, resources are allocated to active queues to handle bursty traffic, but some resources are guaranteed or reserved for every other queue to avoid starvation. And, a fault that causes one send queue to stop, or block, should not affect other send queues.

Figure 2:
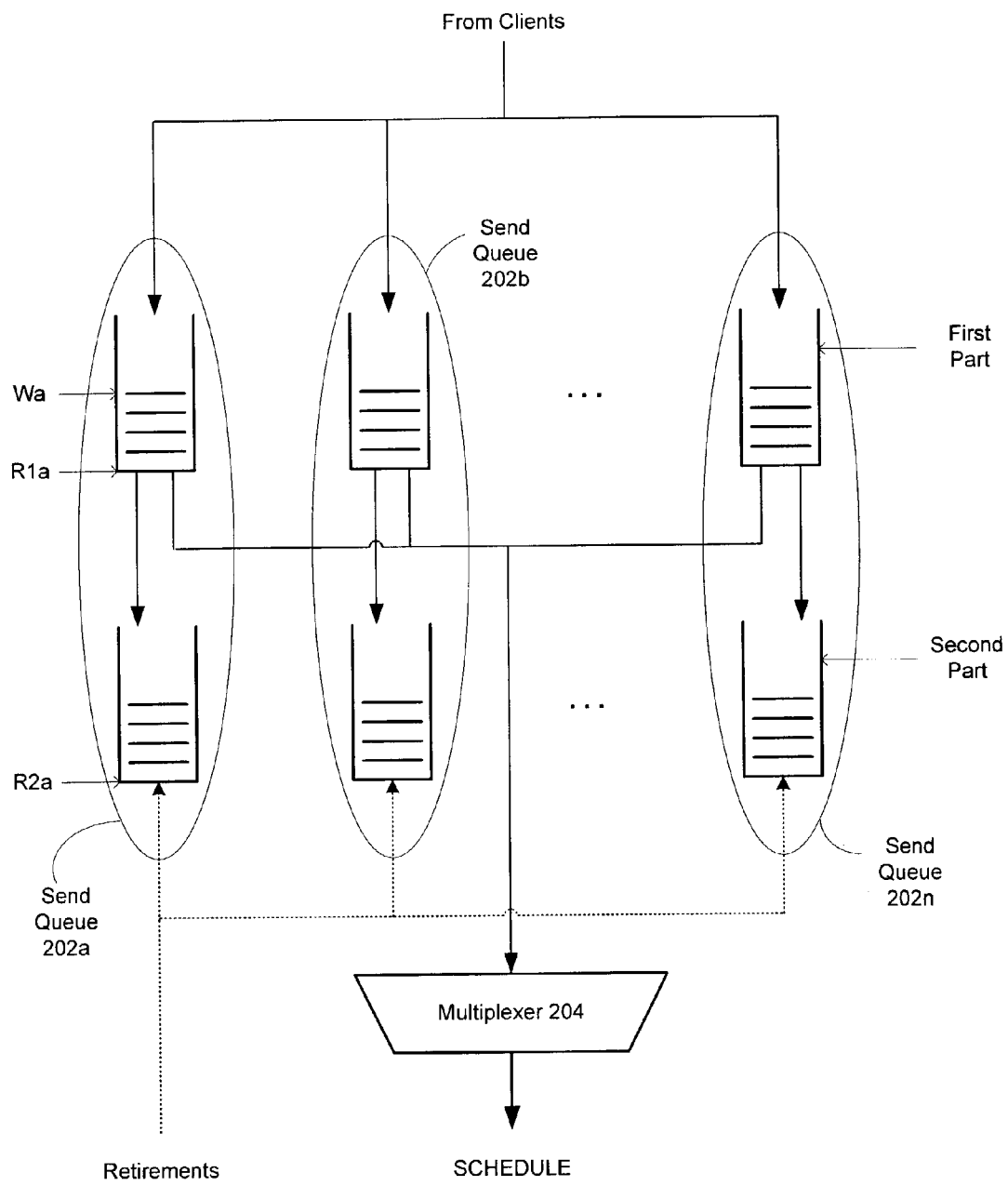
FIG. 2 depicts a plurality of InfiniBand send queues, in accordance with an embodiment of the invention.

FIG. 2 demonstrates a conceptual view of InfiniBand send queues, according to one embodiment of the invention. In this embodiment, each of send queues 202a, 202b, . . . 202n may be envisioned as comprising two parts. A first part receives new WQEs from clients and stores them until they are scheduled or transmitted. The second part stores those WQEs that have been scheduled or transmitted, but which have not yet been acknowledged and retired.

Thus, in FIG. 2, the first part of each send queue is depicted as feeding both the second part and multiplexer 204. Multiplexer 204 feeds WQEs to a scheduler. Illustratively, WQE retirements are signaled by a state machine, in response to ACKs (Acknowledgements) received in receive queues corresponding to the illustrated send queues. When retired, the specified WQE is removed from the second part of the corresponding send queue. As described below, the amount of buffering resources allocated to a send queue dynamically rises and falls as WQEs are queued and retired.

In one implementation of the embodiment of the invention described in conjunction with FIG. 2, an InfiniBand send queue has at least three associated pointers. A write pointer (W) identifies the tail of the queue and indicates where a new WQE should be written. A first read pointer ($R_1$) defines the conceptual boundary between the two parts of the send queue by identifying the next WQE to be scheduled from the queue. A second read pointer ($R_2$) identifies the oldest scheduled WQE that is awaiting retirement (e.g., the head of the queue).

Thus, in FIG. 2, pointers Wa, R1a and R2a represent pointers W, $R_1$ and $R_2$ for send queue 202a. Illustratively, WQEs are retired in the order they were scheduled, because each send queue is tied to one receive queue at another endpoint as part of a reliable connection, in which transmissions are handled and acknowledged in order.

In other embodiments of the invention, a different number or different types of pointers may be used to manage a send queue, and send queues need not be considered in two parts. For example, a single read pointer may be used to manage a send queue configured for transmitting unreliable datagrams. In this case, the "second part" of a send queue described above is omitted, because WQEs may be retired before they are acknowledged.

In one embodiment of the invention, a resource shared among transmission queues comprises a pool of buffer resources for storing queue entries. Each queue is ensured a minimum number of buffers, and may be limited to an instantaneous maximum level of resource. The level of resources actually allocated to a given queue may therefore dynamically fluctuate between its minimum and maximum, depending on the demand for that queue and other queues. The dynamic allocation of resources may be continually or repeatedly recomputed as queue entries are scheduled and/or retired, but with minimal computational burden.

In another embodiment of the invention, a method is provided for arbitrating between different clients or communication sources feeding a send queue. In this method, neither the queue nor a client will be starved for resources regardless of the demand placed on this queue or other queues.

Figure 3:
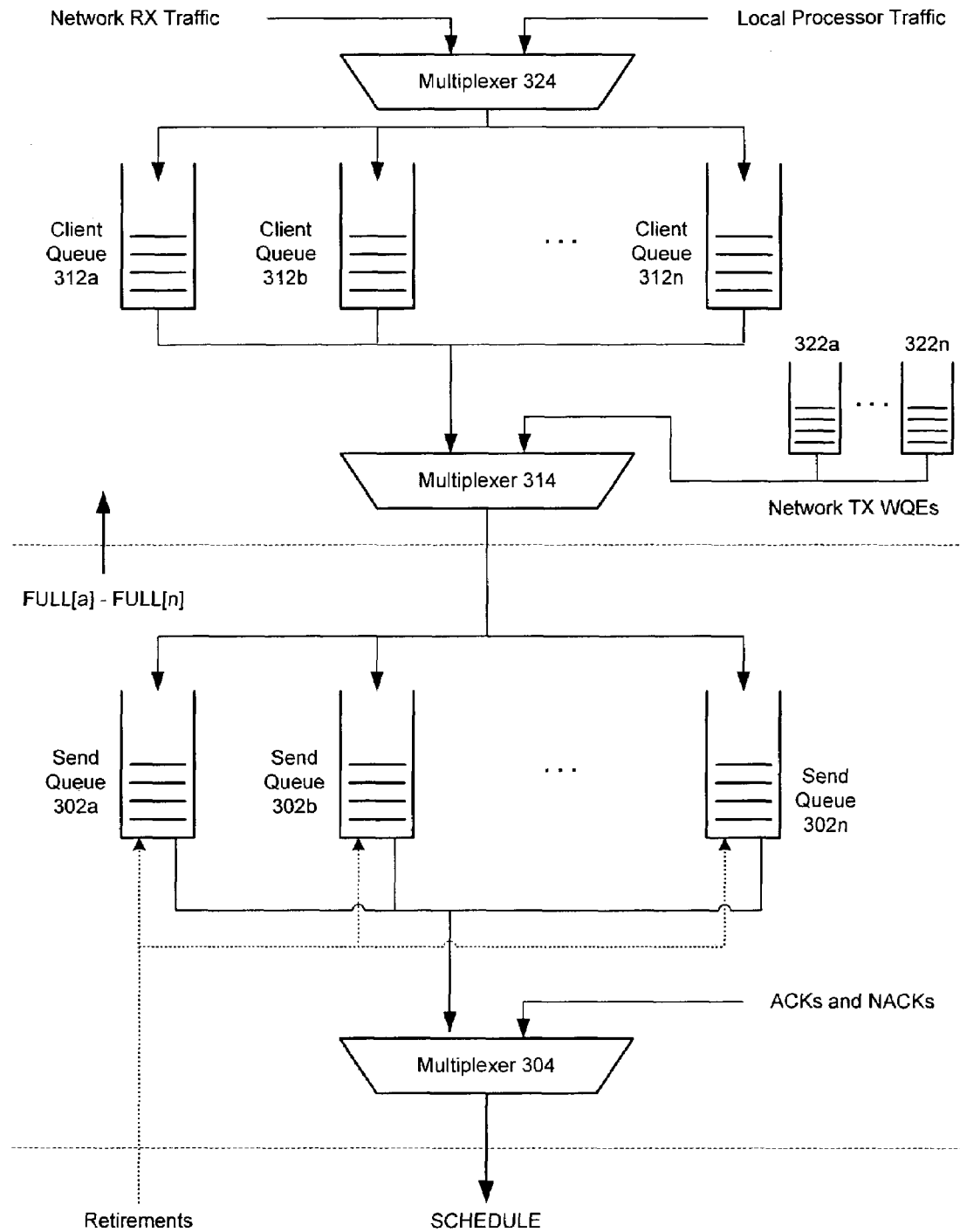
FIG. 3 is a block diagram of an apparatus configured for dynamic allocation of a shared resource among multiple transmission queues, in accordance with an embodiment of the present invention.

FIG. 3 is a block diagram of an apparatus (e.g., a channel adapter) for dynamically allocating a shared resource (e.g., memory buffers) among a set of InfiniBand send queues in an InfiniBand node, according to one embodiment of the invention. The send queues receive three general types of WQEs from clients: SEND messages, RDMA writes and RDMA read requests.

Illustratively, a SEND message from one endpoint to another comprises an encapsulated set of data to be transmitted to the other endpoint. The data may comprise a packet received from a network, a communication generated locally, etc.

An RDMA write involves the RDMA transfer of a set of data to another endpoint. Illustratively, the data may have been received at the current endpoint from a network. Multiple consecutive RDMA writes may be required to perform the RDMA transfer. For example, a large packet of data may require two RDMA writes to transfer the data, plus a SEND message to transfer the packet header.

An RDMA read request involves the transmission of a request for a set of data to be DMA'd from another endpoint (e.g., for transmission over a network from the current endpoint). Multiple consecutive RDMA read requests may be required to perform the entire transfer.

FIG. 3 depicts InfiniBand send queues 302a, 302b, . . . 302n within an InfiniBand channel adapter. Send queues within the channel adapter are operated at the transport layer of the InfiniBand protocols. In one implementation, there are 128 send queues. In this implementation, there is a corresponding client queue (i.e., client queues 312a, 312b, . . . 312n) for each send queue. Each client queue may be fed by one or more clients. The contents of each client queue are forwarded only to the corresponding send queue, via multiplexer 314.

Multiplexer 304 forwards WQEs from the send queues for scheduling, and also forwards acknowledgements and negative acknowledgements to be transmitted to other endpoints. Retirements are processed as described above, to remove from the send queues WQEs that have been scheduled and acknowledged.

Multiplexer 324 places WQEs into the client queues. In this embodiment, multiplexer 324 receives at least two types of traffic: incoming (i.e., receive) network traffic to be forwarded to another endpoint, and communications generated by a local processor to be sent to other endpoints.

Illustratively, for each set of incoming network traffic that is received, one or more RDMA write WQEs are placed in a client queue. For each generated local communication, a SEND message WQE may be placed in a client queue. In addition to RDMA write WQEs and SEND message WQEs from client queues 312a, 312b, . . . 312n, multiplexer 314 also receives and forwards RDMA read request WQEs (e.g., for network transmit operations). FIG. 3 thus demonstrates the receipt of different types of WQEs from different clients for populating InfiniBand send queues.

FIG. 3 also demonstrates the direct access to multiplexer 314 enjoyed by network transmit processes. Illustratively, there are n network transmit processes (queues 322a-322n), one for each send queue, but their communications are not submitted through client queues. When both a client queue (or client) and a network transmit process need to post a WQE to a send queue, one of the requesters is selected (e.g., via round robin, priority or other order). Multiplexer 314 then arbitrates among all the current requesters to determine which requestor (client queue or network transmit process) is permitted to post a WQE to its associated send queue.

In an embodiment of the invention such as depicted in FIG. 3, an InfiniBand channel adapter has one or more resources that must be shared among multiple send queues (e.g., buffers). In this embodiment, sets of information to be scheduled or transmitted are variably sized, depending on the type of message or RDMA operation. However, a WQE is queued in the form of a fixed size buffer representing the full-size WQE. Each buffer includes, among other things, one or more parameter fields for identifying the length and/or type of the WQE, locating the remainder of the WQE, and so on.

In one implementation of this embodiment, the entire content of a short WQE may be stored in a WQE buffer. In contrast, a buffer queued for a longer WQE includes a pointer to, or identifier of, a location where the remainder of the WQE is stored. In this implementation a WQE buffer is approximately 160 bits in size.

The fixed-size WQE buffers are drawn from a shared pool of buffers available for allocation to any of the send queues. In one implementation, the pool contains approximately 1024 buffers.

Each send queue has a minimum and maximum allocation of buffers. The minimum allocation represents a number of buffers that will be kept available (e.g., held in reserve) for allocation to the queue, regardless of other queues' allocations or demands. Thus, a queue is guaranteed to always be allocated at least its minimum number of buffers, but may be limited to its maximum.

The minimum and maximum values are assigned to a queue pair when it is generated (e.g., for a new end-to-end connection), and are deleted when the queue pair is torn down. These values are dynamic, and may be adjusted without reinitializing the channel adapter. A queue's minimum and maximum allocations, as well as a current allocation, may be stored as local values within a context associated with the queue.

And, as described above, a number of pointers may be maintained for each send queue. Illustratively, a write or tail pointer/identifier identifies the tail of the queue (e.g., the most recently allocated buffer). A first read pointer identifies the buffer representing the next WQE to be scheduled, while a second read pointer identifies the head of the queue (e.g., the next scheduled WQE to be acknowledged and retired). These pointers may be stored as part of the queue's context.

To track allocation of WQE buffers from the pool, a list, array or similar data structure is employed. In one embodiment, the list includes an element for each buffer. For each send queue that is not empty, the list comprises separate lists or chains identifying the buffers allocated to each send queue. Each element in the list of allocated buffers that represents an allocated buffer points to the next buffer allocated to the same send queue. Thus, the lists or chains of buffers track the allocation or deallocation of buffers to/from a queue, and can be used to overlay or represent all the queues within a single data structure.

Another data structure (e.g., list, array, heap) identifies the unallocated or free buffers within the shared pool. This structure facilitates easy identification and allocation of a buffer when needed.

Figure 4:
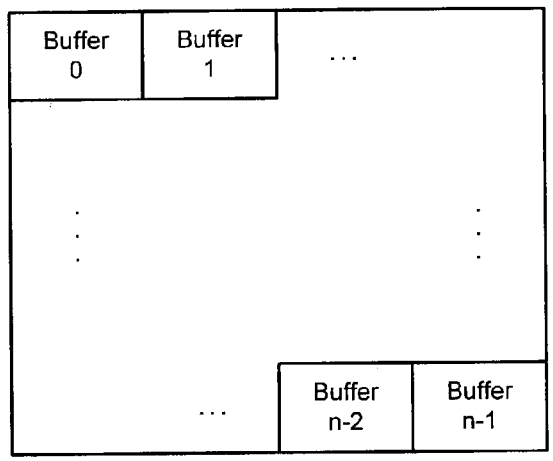
FIG. 4 depicts several data structures for facilitating the dynamic allocation of a shared resource, in accordance with an embodiment of the present invention.
Figure 4:
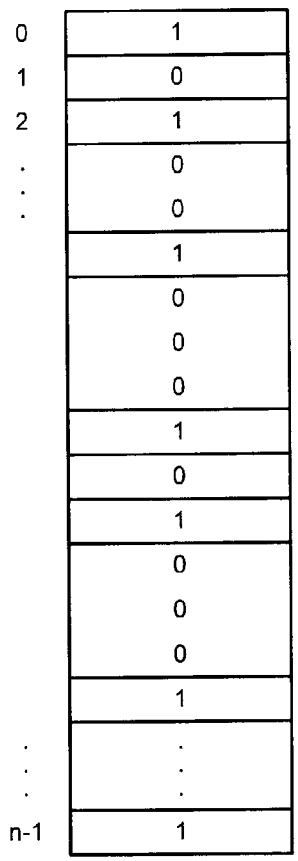
Figure 4:
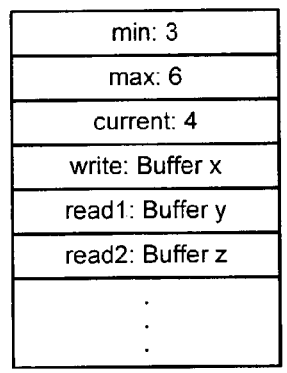
Figure 4:
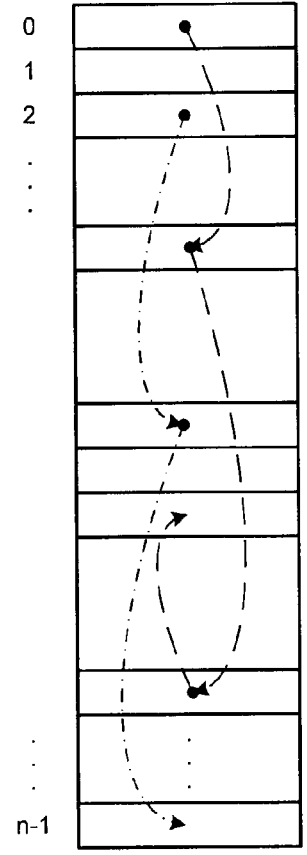

FIG. 4 illustrates the various data structures, described above, that may be employed in an embodiment of the invention. In FIG. 4, WQE buffer pool 402 includes n WQE buffers (e.g., 1024) for allocation to m send queues (e.g., 128). All of the buffers are of uniform size. In this embodiment, an allocated buffer includes non-transparent fields, or a fixed format portion, of a WQE.

WQE buffers may or may not comprise contiguous portions of memory. Illustratively, a buffer representing a SEND message WQE may contain a pointer to the storage location(s) of one or more packets encapsulated in the message. A buffer representing an RDMA write may contain a pointer to a memory location at which the payload is stored.

Allocated list 404 includes n elements, any or all of which may be linked to form a maximum of m disjoint, nonintersecting, chains (e.g., linked lists) of buffers allocated to different send queues. Thus, one send queue in FIG. 4 includes at least four buffers, starting at buffer 0. Another send queue includes at least three buffers, starting at buffer 2. The element in list 404 that corresponds to the last buffer allocated to a queue may point to itself or have a null pointer.

Free list 406 also includes n elements, and indicates which of the WQE buffers of buffer pool 402 are free, and which are allocated. When a buffer is needed, free list 406 may be consulted to quickly determine if any are free and, and if so, identify one. Each element of free list 406 may be a single bit in dimension.

Context 408 comprises various values and/or parameters associated with a particular send queue. In the illustrated embodiment of the invention, the send queue's context includes a minimum (Min) and maximum (Max) number of WQE buffers that may be allocated to the queue, as well as the number of buffers currently allocated (Current). The context may also include values for any pointers used to maintain the queue. In other embodiments, other information may also be included in a queue's context.

In the embodiment of FIG. 4, buffer pool 402, allocated list 404 and free list 406 are global structures for use by all send queues. Conversely, a separate context may be locally maintained by each queue, and may be stored in local memory or registers for rapid access. Illustratively, when a WQE buffer is allocated or de-allocated, only the context of the affected send queue needs to be updated. Some or all of the global structures will also be updated.

When a channel adapter is initialized, each of its send queues is initially empty. At that time, buffer pool 402 is filled with unused buffers, and therefore allocated list 404 has no linked elements and free list 406 indicates that every buffer is free.

In one embodiment of the invention, the sum of all send queues' minimum allocation sizes (i.e., $\Sigma$ Min=Min(0)+Min(1) ... +Min(N)) is less than the total number of buffers in the shared buffer pool (e.g., N). This allows dynamic allocation of (N–$\Sigma$ Min) buffers during operation of the channel adapter. In this embodiment, the maximum number of WQE buffers allocated to a send queue i may therefore be constrained as follows:

$$\text{Min}(i) \leq \text{Max}(i) \leq N$$

In this embodiment, a send queue's minimum and maximum sizes may be configured at initialization. Thereafter, as buffers are allocated among the queues, the queue's actual size is constrained by the number of available buffers and the number of buffers that must be reserved so that other queues can be allocated their minimum sizes.

A set of signals, depicted as FULL in FIG. 3, informs clients of the status of individual send queues. The FULL signal can be raised for a particular queue to prevent any WQEs from being placed in the queue. In the illustrated embodiment, FULL[i] represents the FULL signal for send queue i. The FULL signal for each queue in this embodiment comprises two signal lines and can therefore signal four different statuses. Illustratively, the statuses may be used to signal the number of additional WQE buffers that can be allocated to the send queue without exceeding its maximum size.

Thus, in one implementation of this embodiment, the four values of FULL[i] are interpreted as zero (i.e., the send queue is at its maximum allowable size), one, two, or three or more. In this implementation, the maximum number of WQE buffers needed for a transaction is three. Asserting or raising FULL[i] in this implementation means that a value of zero is signaled—no additional buffers can be allocated to the queue, and therefore no elements may be posted to send queue i. De-asserting or lowering FULL[i] in this implementation means setting or changing the value to one, two or three.

In one alternative embodiment of the invention, FULL[i] only remains asserted when the send queue is full—i.e., when the number of currently allocated WQE buffers equals Max(i). This embodiment may be suitable for use with clients that never need more than one WQE for a transaction. In this embodiment, FULL[i] is de-asserted only when the queue's current size is less than its maximum size. In yet other embodiments, FULL may be implemented in some other manner to indicate to a client the status of a send queue.

As long as FULL[i] is asserted, no client may post a WQE to send queue i. Illustratively, FULL is temporarily asserted for every send queue each time a WQE is posted to any queue. FULL may also be temporarily raised when a WQE is retired from a queue. This provides time to update the send queue's context and the global data structures. A FULL signal may also be asserted for a send queue that is disabled or that has reached its maximum size. For a send queue i, FULL[i] may be de-asserted in one embodiment of the invention if and when:

Available$\neq$0 AND [(current($i$)<min($i$)) OR (current($i$)<max($i$)) AND (Available>Reserve)]

In this embodiment, "Available" is a global variable indicating the number of unallocated WQE buffers in the shared WQE buffer pool (and may be determined by examining the free list). "Reserve" is a global variable indicating the number of WQE buffers that must be reserved for send queues currently using less than their minimum guaranteed allotment of buffers. More particularly, Reserve=$\Sigma$ (Min−Current) across all send queues for which (Min$\geq$Current).

When a send queue needs an additional WQE buffer in order to accept a WQE from a client, one or more global and/or local values may be consulted. Illustratively, a determination is first made as to whether any buffers are free (i.e., is Available>0) and/or whether all the free buffers are reserved (e.g., is Available>Reserve). Then the current number of buffers allocated to the queue is compared to the queue's minimum and/or maximum. If Current<Min, a buffer can be allocated as long as Available>0. If, however, Current$\geq$Min, then a buffer can only be allocated to the queue if Current<Max and Available>Reserve.

Because different clients may have different quantities or types of information to transmit, clients' access to send queues may be arbitrated on client-construct boundaries. For example, when a network receive client wants to queue multiple RDMA writes and a SEND message to effect an RDMA transfer, or a network transmit client wants to queue multiple RDMA read requests, each transaction will be queued in its entirety or not at all. In other words, WQEs for one transaction will not be interleaved with WQEs of another transaction.

Illustratively, different clients may be serviced on a round-robin basis or other suitable scheme (e.g., priority, weighted round-robin). When a first client is the next client to be given access to a particular client queue or send queue, and has a transaction comprising multiple WQEs, no other client will be able to place a WQE into that queue until the first one is served.

Therefore, in one embodiment of the invention, transactions may be bounded regarding the number of WQEs needed to queue the transaction. Illustratively, a network receive operation may be limited to three WQEs (e.g., two RDMA writes plus a SEND), a network transmit operation may also be limited to three WQEs (e.g., three RDMA read requests) and a SEND message may be limited to one WQE. Clients may be responsible for ensuring that all WQEs of a given transaction can be, and are, posted together.

Figure 5:
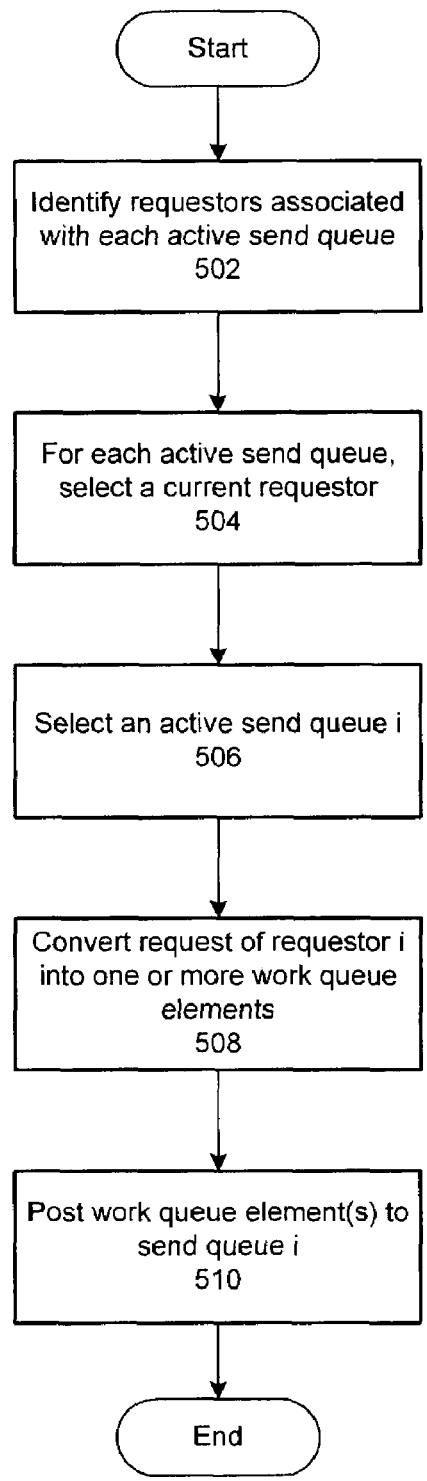
FIG. 5 is a flowchart demonstrating one method of arbitrating among multiple client requesters, in accordance with an embodiment of the invention.

FIG. 5 depicts a method of arbitrating client access to InfiniBand send queues, according to one embodiment of the invention. In this embodiment, one client queue is maintained and one network transmit process exists for each send queue. The client queue receives transactions from any number of clients (e.g., a network receive process, a local processor).

In this method, a requestor is first selected for each active send queue. The selected requestor may be either a client queue (or a client associated with a client queue) or a network transmit process. Arbitration is performed across the send queues to determine which requester (client queue or network transmit process) is allowed to place its next transaction into the corresponding send queue, in the form of one or more WQEs.

In operation 502, for each send queue, the associated requesters that are active (i.e., have at least one request to be placed in the send queue) are identified. The requesters may include network transmit processes (e.g., one for each send queue), clients (or client queues if more than one client uses a particular send queue) and/or other entities. As described above, multiple clients may feed a particular send queue through one client queue. Each requester has one or more transactions or sets of information to be placed in the corresponding send queue.

In operation 504, a current requestor is selected for each active send queue, or for each active send queue whose current requestor has not yet been served.

In operation 506, one of the active send queues (send queue i) is selected via arbitration. The client may be selected on a round-robin basis, in priority order, or on some other basis.

In operation 508, the current or oldest transaction or request of the selected requestor is converted into one or more WQEs. The number of WQEs depends upon the type of transaction (e.g., network receive traffic, local processor traffic).

In operation 510, the work queue elements are placed into send queue i as contiguous or consecutive entries. In other words, no other requestor is given access to the send queue until the current requestor has finished queuing its transaction. After operation 510, the illustrated method may end or return to operation 502 to select another requestor and/or send queue to be served.

Figure 6:
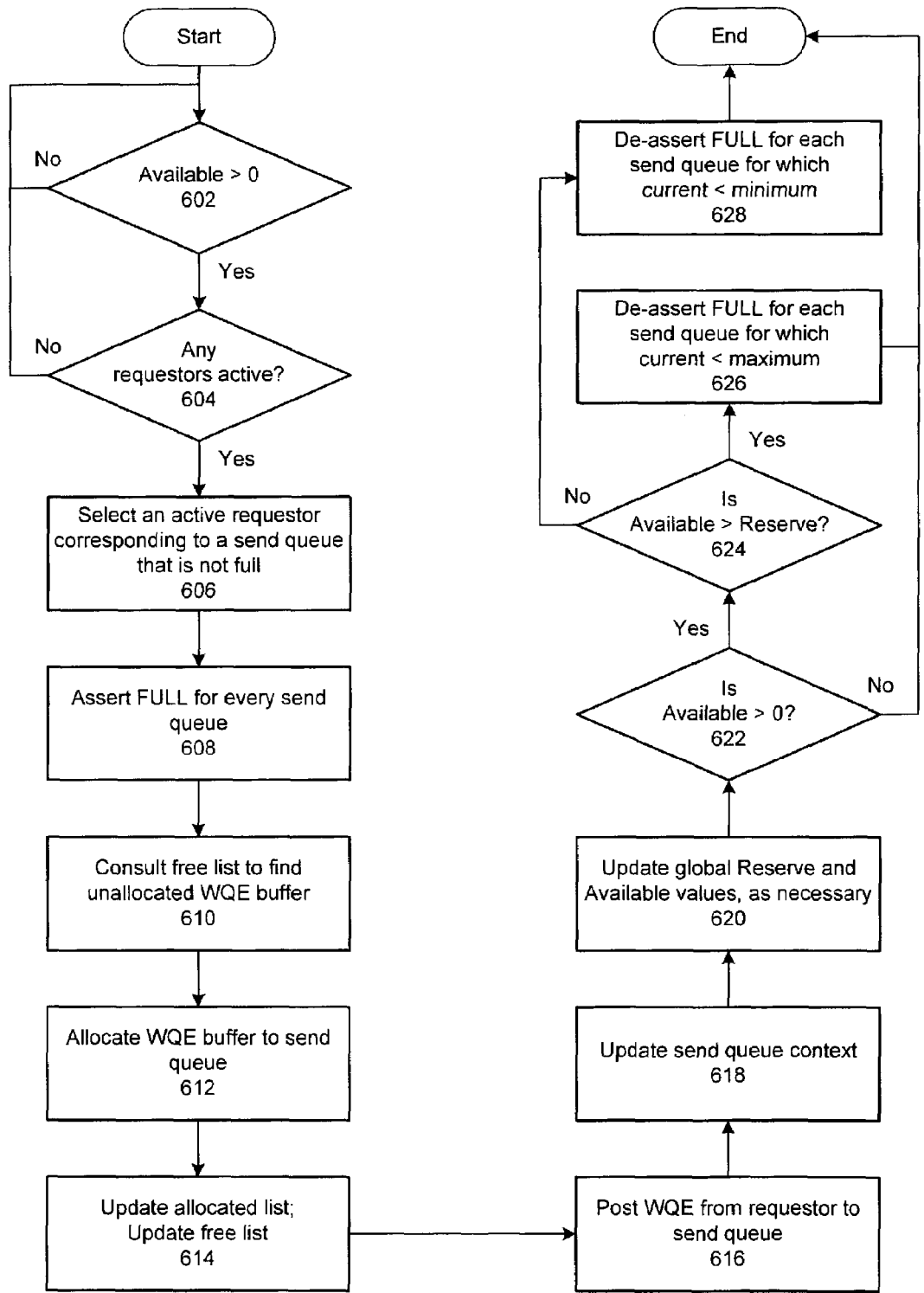
FIG. 6 is a flowchart demonstrating one method of dynamically allocating portions of a shared resource among multiple transmission queues, in accordance with an embodiment of the invention.

FIG. 6 demonstrates a method of dynamically allocating a shared resource (e.g., memory buffers) among multiple InfiniBand send queues of a channel adapter, according to one embodiment of the invention. Each send queue is fed by one or more requesters. In particular, in this embodiment of the invention, for each send queue there is a corresponding client queue (fed by one or more clients) and a network transmit process.

In the illustrated embodiment of the invention, a global Available value may indicate how many WQE buffers are available. A global Reserve value may indicate how many WQE buffers must be reserved to ensure each send queue can be allocated its minimum number of allotted buffers. In this embodiment, Available and Reserve are updated each time a WQE is queued or de-queued to/from a send queue.

As described previously, when a WQE is queued, each send queue's FULL signal may be temporarily asserted while its context and the global values are updated. The FULL signals may be received from the send queues themselves or a state machine configured to monitor the statuses of the send queues.

In operation 602, if Available=0, each send queue's FULL signal remains asserted because there is no more of the shared resource available. Thus, the method of FIG. 6 remains in operation 602 until Available>0.

In operation 604, one or more active requesters (i.e., client queues, network transmit processes) are identified. Each identified requestor is waiting to post one or more WQEs to its corresponding send queue.

In operation 606, a send queue and an active requestor for that queue are selected. For a particular send queue to be selected, it must not be full. Send queues that are full and cannot accept a WQE may be identified by their corresponding FULL signals. Illustratively, when FULL is asserted for a particular send queue, it may mean that the send queue is at its maximum permitted size. Alternatively, a FULL signal may indicate how many, if any, WQEs it can accept before it will be full.

In different embodiments of the invention, different algorithms may be applied to select a requestor when there is more than one active requestor and more than one of the active requestors correspond to send queues that are not full.

In one embodiment of the invention, if Current$\geq$Min for a send queue, and Available$\leq$Reserve, then no more buffers may be allocated to the selected send queue. Therefore, as long as Available$\leq$Reserve, a different send queue (e.g., having Current<Min) must be selected.

In operation 608, a FULL signal is raised or asserted for every send queue, to temporarily prevent any requesters from posting to any send queue.

In operation 610, a free list (e.g., free list 406 of FIG. 4) is consulted to find a free WQE buffer within a shared pool of buffers, to allocate to the selected send queue.

In operation 612, the WQE buffer is allocated to the selected send queue to receive the next WQE from the selected requestor.

In operation 614, an allocated list (e.g., allocated list 404 of FIG. 4) and the free list are updated to reflect the new allocation.

In operation 616, a WQE is posted from the requestor to the send queue (i.e., in the newly allocated buffer). Illustratively, this requestor will remain the current or active requester for the send queue at least until all WQEs of a transaction are posted to the send queue.

In operation 618, the context of the send queue to which a WQE was just posted is updated. This may include updating one or more pointers (e.g., a write pointer identifying the tail of the send queue) and one or more local values (e.g., current number of buffers allocated to the queue).

In operation 620, one or more global values or variables are updated. For example, the Available value may be decremented to indicate that there is one less free WQE buffer. Further, the Reserve value may be decremented if the just-allocated WQE buffer represents one of the minimum number of buffers allotted to the send queue. In particular, if after operation 618 Current≦Min for the send queue to which the WQE was posted, then Reserve is decremented.

Because only one send queue is posted to at a time in this embodiment of the invention, the global Reserve value may be easily decremented or incremented during operation of the channel adapter, without having to examine every send queue's context.

In operation 622, the global Available value is examined. In this embodiment, none of the asserted FULL signals can be de-asserted if there are no Available (or free) WQE buffers. Thus, if Available>0, the method continues at operation 624; otherwise, the method ends or waits until Available>0.

In operation 624, Available and Reserve are compared. In this embodiment, the determination of whether a FULL signal asserted for a given send queue can be de-asserted depends on whether Available>Reserve as well as the queue's current size. In particular, if Available≦Reserve, then only queues that have not reached their minimum sizes can be allocated another buffer. But, if Available>Reserve, then any queue not yet at its maximum size can accept a new buffer. Thus, if Available>Reserve the method continues at operation 626; otherwise, the method advances to operation 628.

In operation 626, FULL is de-asserted for each send queue whose current size is less than its maximum size. The method then ends or returns to operation 602.

In operation 628, FULL is de-asserted for each send queue whose current size is less than its minimum guaranteed size. The method then ends or returns to operation 602.

When a WQE scheduled or transmitted from a send queue is acknowledged by its recipient, it can be retired from the send queue. When a WQE is retired, the send queue's current size is decremented and one or more pointers for maintaining the queue may be updated. The global allocated and free lists are updated accordingly. Also, the global Available value is increased, and the global Reserve value may also be increased (e.g., if Current is now<Min for the send queue). FULL may or may not be temporarily asserted after a WQE is retired, to allow the global and local values to be updated.

Figure 7:
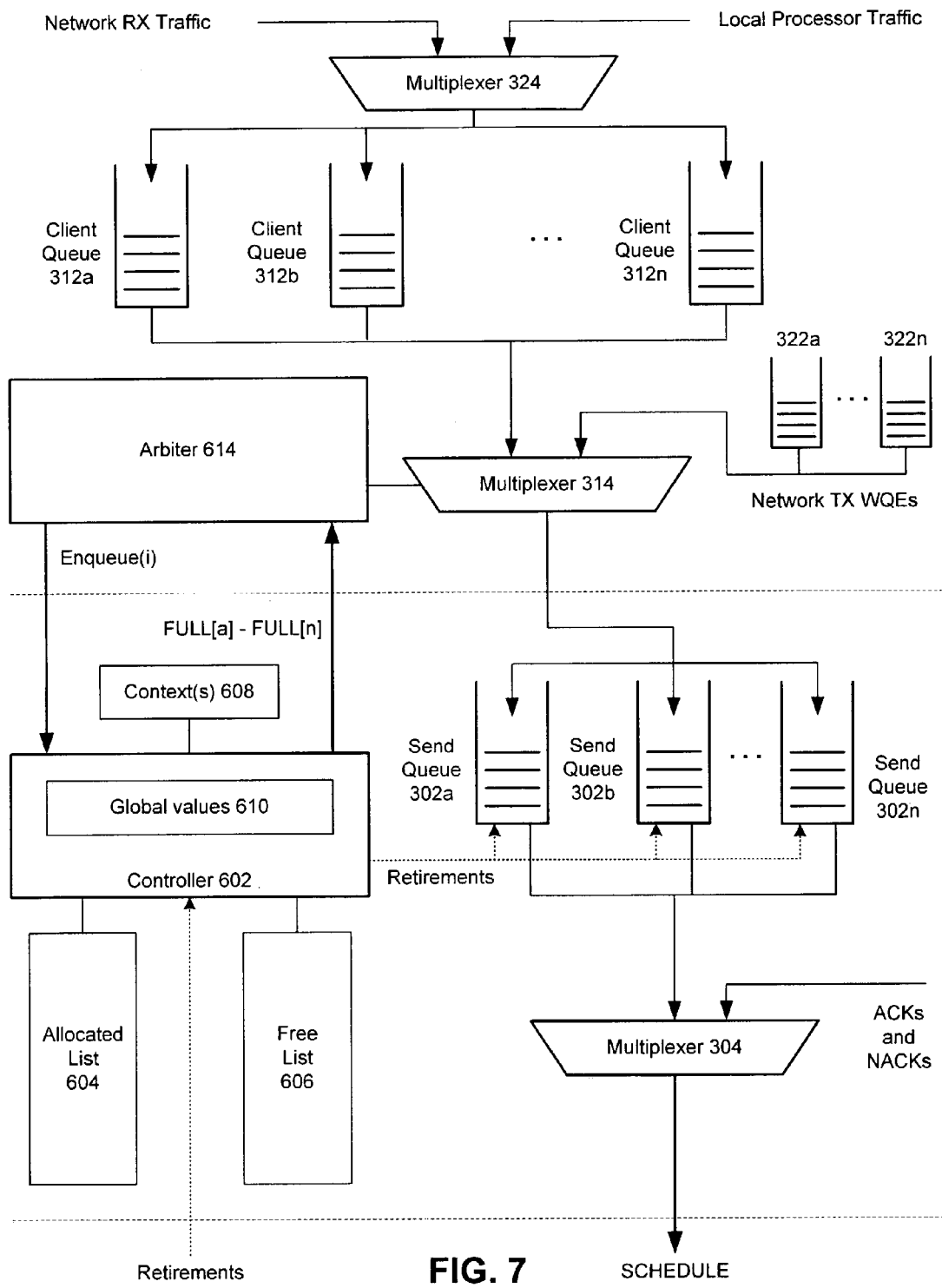
FIG. 7 is a block diagram of the apparatus of FIG. 3, including components for controlling operation of an embodiment of the invention.

FIG. 7 demonstrates components for controlling the embodiment of the invention depicted in FIG. 3. In FIG. 7, controller 602 uses allocated list 604, free list 606 and context(s) 608 to manage send queues 302a-302n. The data structures 604, 606 and 608 may be similar to data structures 404, 406, 408 of FIG. 4. Controller 602 also maintains global values 610 (e.g., Available and Reserve).

The controller raises FULL signals as described above, by signaling arbiter 614, which controls multiplexer 314. Arbiter 614 uses an enqueue signal to inform controller 602 of the destination (i.e., which send queue) of the next WQE that it forwards. Thus, raising enqueue(i) indicates that send queue i will receive the next WQE.

Controller 602 also receives notification of WQE retirements, and carries out those retirements by signaling the corresponding send queues.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of dynamically allocating buffer resources among multiple send queues, comprising:
   maintaining a set of local values for each send queue, wherein said local values include at least:
   a Current value configured to indicate a number of buffers currently allocated to the send queue;
   a Min value configured to indicate a number of buffers reserved for the send queue; and
   a Max value configured to indicate a maximum number of buffers that may be allocated to the send queue;
   maintaining a set of global values, wherein said global values include at least:
   an Available value configured to indicate a number of unallocated buffers; and
   a Reserve value configured to indicate a reserved number of said unallocated buffers, wherein Reserve is equal to the sum of the differences between Min and Current for each send queue for which Min>Current;
   allocating a first unallocated buffer to a first send queue for an entry to be added to the first send queue;
   asserting a full signal for each of the multiple send queues;
   updating one or more of said global values and said local values for the first send queue; and
   if Available>0, de-asserting said full signal for one or more of the multiple send queues.

2. The method of claim 1, wherein said updating comprises:
   updating Current for the first send queue.

3. The method of claim 2, wherein said updating further comprises:
   decreasing Available; and
   if Current≦Min for the first send queue, decreasing Reserve.

4. The method of claim 1, further comprising:
   retiring an entry from a second send queue;
   updating one or more of said global values; and
   updating one or more of said local values for the second send queue.

5. The method of claim 1, further comprising, prior to said allocating:
receiving an entry to be added to the first send queue; and
for the first send queue, determining whether Current<Max.

6. The method of claim 5, wherein said determining comprises examining said full signal for the first send queue.

7. The method of claim 1, wherein said allocating comprises:
examining a free list of buffers; and
modifying an allocated list of buffers to reflect said allocation of the first unallocated buffer.

8. The method of claim 1, wherein said de-asserting comprises:
de-asserting said full signal for each send queue for which Current<Min.

9. The method of claim 1, wherein said de-asserting comprises:
if Available>Reserve, de-asserting said full signal for each send queue for which Current<Max.

10. The method of claim 1, wherein said full signal, when asserted for a send queue, indicates that no entry may be added to the send queue.

11. The method of claim 10, wherein said full signal, when de-asserted for the send queue, indicates than an entry may be added to the send queue.

12. The method of claim 10, wherein said full signal, when de-asserted for the send queue, is modified to reflect a quantity of entries that may be added to the send queue.

13. The method of claim 1, wherein said set of local values further includes:
a write pointer configured to identify a last buffer allocated to the queue;
a first read pointer configured to identify a buffer corresponding to a next entry to be scheduled from the queue; and
a second read pointer configured to identify a buffer corresponding to a next entry to be retired from the queue.

14. The method of claim 1, further comprising:
implementing the multiple send queues within a data structure comprising one element for each buffer;
wherein the first send queue comprises a first linked chain of data structure elements allocated to the first send queue.

15. The method of claim 1, further comprising arbitrating access to the first send queue by:
identifying one or more requestors having a transaction to add to the first send queue;
selecting a first requester of the one or more requesters; and
adding a transaction of the first requester to the first send queue using one or more buffers;
wherein a different requester is selected to add a transaction to the first send queue only after said transaction of the first requestor is added.

16. A computer readable storage medium storing instructions that, when executed by a computer, cause the computer to perform a method of dynamically allocating buffer resources among multiple send queues, the method comprising:
maintaining a set of local values for each send queue, wherein said local values include at least:
a Current value configured to indicate a number of buffers currently allocated to the send queue;
a Min value configured to indicate a number of buffers reserved for the send queue; and
a Max value configured to indicate a maximum number of buffers that may be allocated to the send queue;
maintaining a set of global values, wherein said global values include at least:
an Available value configured to indicate a number of unallocated buffers; and
a Reserve value configured to indicate a reserved number of said unallocated buffers, wherein Reserve is equal to the sum of the differences between Min and Current for each send queue for which Min>Current;
allocating a first unallocated buffer to a first send queue for an entry to be added to the first send queue;
asserting a full signal for each of the multiple send queues;
updating one or more of said global values and said local values for the first send queue; and
if Available>0, de-asserting said full signal for one or more of the multiple send queues.

17. A method of managing allocation of a shared resource among multiple queues, comprising:
modifying the content of a first queue;
asserting a full signal for each queue in response to said modifying, wherein no entry may be posted to a queue while said full signal is asserted for the queue;
updating a set of local values for the first queue, wherein said local values comprise:
a Min value configured to indicate a minimum amount of the shared resource to be allocable to the first queue regardless of the amount of the shared resource allocated to other queues on the multiple queues;
a Max value configured to indicate a maximum amount of the shared resource to be allocated to the first queues regardless of the amount of the shared resources allocated to other queues on the multiple queue; and
a Current value configured to indicate a current amount of the shared resource allocated to the first queue;
updating a set of global values for the multiple queues; and
if the shared resource is not completely allocated, de-asserting said full signal for one or more of the multiple queues.

18. The method of claim 17, wherein said modifying includes one of:
adding an entry to the first queue; and
retiring an entry from the first queue.

19. The method of claim 17, wherein said de-asserting said full signal for a queue comprises:
signaling a number of portions of the shared resource that may be allocated to the queue before it reaches a maximum allocation of the shared resource, wherein said number of portions is greater than zero.

20. The method of claim 17, wherein said de-asserting said full signal for a queue comprises:
signaling a number of entries that may be added to the queue before it reaches a maximum size, wherein said number is greater than zero.

21. The method of claim 17, wherein said global values comprise:
an Available value configured to indicate an amount of the shared resource not allocated to any of the multiple queues; and
a Reserve value configured to indicate an amount of the shared resource reserved to ensure each of the multiple queues can be allocated its Min value.

22. The method of claim 21, wherein said modifying comprises:
   allocating a portion of the shared resource to the first queue if:
      Available<0; and
         Current<Min for the first queue; or
         Available<Reserve and Current<Max for the first queue; and
   posting an entry to the allocated portion of the shared resource.

23. The method of claim 21, wherein said updating said set of local values comprises:
   updating said Current value for the first queue.

24. The method of claim 21, wherein said updating said set of global values comprises:
   updating Available; and
   if Current<Min for the first queue, updating Reserve.

25. The method of claim 21, further comprising, prior to said modifying:
   initializing Reserve to the sum of the differences between said Min and said Current values for each queue for which Current<Min.

26. The method of claim 25, wherein:
   said updating said set of local values comprises:
      adjusting said Current value for the first queue by a first increment; and
   said updating Reserve comprises:
   adjusting Reserve by said first increment.

27. The method of claim 21, wherein the shared resource is not completely allocated if Available<0.

28. The method of claim 21, wherein said de-asserting comprises:
   if Available<0, de-asserting said full signal for each queue for which Current<Min.

29. The method of claim 21, wherein said de-asserting comprises:
   if Available<Reserve, de-asserting said full signal for each queue for which Current<Max.

30. The method of claim 21, wherein said de-asserting comprises:
   de-asserting said full signal for a queue if:
      Available<0; and
         Current<Min for the queue; or
      Available<Reserve and Current<Max for the queue.

31. The method of claim 17, further comprising:
   maintaining a data structure comprising one element for each portion of the shared resource;
   wherein the first queue comprises a first chain of data structure elements representing portions of the shared resource allocated to the first queue; and
   a second queue comprises a second chain of data structure elements representing portions of the shared resource allocated to a second queue.

32. The method of claim 17, further comprising arbitrating access to the first queue by:
   identifying one or more requesters having a transaction to add to the first queue;
   selecting a first requestor of the one or more requestors; and
   adding a transaction of the first requestor to the first queue using one or more portions of the shared resource;
   wherein a different requestor is selected to add a transaction to the first queue only after said transaction of the first requester is added.

33. A computer readable storage medium storing instructions that, when executed by a computer, cause the computer to perform a method of managing allocation of a shared resource among multiple queues, the method comprising:
   modifying the content of a first queue;
   asserting a full signal for each queue in response to said modifying, wherein no entry may be posted to a queue while said full signal is asserted for the queue;
   updating a set of local values for the first queue, wherein said local values comprises:
      a Min value configured to indicate a minimum amount of the shared resource to be allocable to the first queue regardless of the amount of the shared resource allocated to other queues on the multiple queues;
      a Max value configured to indicate a maximum amount of the shared resource to be allocated to the first queues regardless of the amount of the shared resources allocated to other queues on the multiple queue; and
      a Current value configured to indicate a current amount of the shared resource allocated to the first queue;
   updating a set of global values for the multiple queues; and
   if the shared resource is not completely allocated, de-asserting said full signal for one or more of the multiple queues.

34. An apparatus for sharing a resource among multiple queues, comprising:
   a plurality of queues sharing a resource;
   for each queue in the plurality of queues, a set of local values, including:
      a Min value configured to indicate a minimum amount of the shared resource to be allocable to the queue regardless of the amount of the shared resource allocated to other queues;
      a Max value configured to indicate a maximum amount of the shared resource to be allocable to the queue regardless of the amount of the shared resource allocated to other queues; and
      a Current value configured to indicate a current amount of the shared resource allocated to the queue;
   for each queue in the plurality of queues, a full signal configured to indicate, when asserted, that the queue cannot accept a new entry; and
   a set of global values, including:
      an Available value configured to indicate an amount of the shared resource not allocated to any of the queues; and
      a Reserve value configured to indicate an amount of the shared resource reserved to ensure each of the queues can be allocated its Min value.

35. The apparatus of claim 34, wherein said set of local values is updated for a first queue whenever an entry is added to or retired from the first queue.

36. The apparatus of claim 34, wherein said set of global values is updated whenever an entry is added to or retired from one of the plurality of queues.

37. The apparatus of claim 34, wherein a new entry can be added to a first queue if:
   Available<0; and
      Current<Min for the first queue; or
      Available<Reserve and Current<Max for the first queue.

38. The apparatus of claim 34, wherein said full signal is asserted for each queue in the plurality of queues when an entry is added to one of the plurality of queues.

39. The apparatus of claim 34, wherein a full signal asserted for a first queue is de-asserted if:
   Available<0; and
      Current<Min for the first queue; or
      Available<Reserve and Current<Max for the first queue.

40. The apparatus of claim 34, wherein the shared resource comprises a set of buffers, the apparatus further comprising:

for each queue in the plurality of queues:
- a write pointer configured to identify a last buffer allocated to the queue;
- a first read pointer configured to identify a buffer corresponding to a next entry to be scheduled from the queue; and
- a second read pointer configured to identify a buffer corresponding to a next entry to be retired from the queue.

41. The apparatus of claim 34, further comprising:

a data structure comprising one or more chains of allocated portions of the shared resource;

wherein each said chain includes the portions of the shared resource allocated to a different queue in the plurality of queues.

42. The apparatus of claim 34, wherein said apparatus comprises an InfiniBand channel adapter.

* * * * *

UNITED STATES PATENT AND TRADEMARK OFFICE
CERTIFICATE OF CORRECTION

| | |
|---|---|
| PATENT NO. | : 7,295,565 B2 |
| APPLICATION NO. | : 10/328470 |
| DATED | : November 13, 2007 |
| INVENTOR(S) | : Ariel Hendel |

It is certified that error appears in the above-identified patent and that said Letters Patent is hereby corrected as shown below:

In Claim 15 (at column 13, line 50), please delete the words "requester" and "requesters" and replace with the words --requestor-- and --requestors-- respectively, so that the phrase reads "selecting a first requestor of the one or more requestors;".

In Claim 15 (at column 13, line 52), please delete the word "requester" and replace with the word --requestor--.

In Claim 15 (at column 13, line 54), please delete the word "requester" and replace with the word --requestor--.

In Claim 17 (at column 14, line 34), please delete the word "allocated" and replace with the word --allocable--.

In Claim 17 (at column 14, line 35), please delete the word "queues" and replace with the word --queue--.

In Claim 17 (at column 14, line 36), please delete the words "resources" and "on" and replace with the words --resource-- and --in-- respectively, so that the line reads "resource allocated to other queues in the multiple".

In Claim 22 (at column 15, line 5), please delete the expression "Available<0" and replace with the expression --Available>0--.

In Claim 22 (at column 15, line 7), please delete the expression "Available<Reserve" and replace with the expression --Available>Reserve--.

In Claim 27 (at column 15, line 30), please delete the expression "Available<0" and replace with the expression --Available>0--.

In Claim 28 (at column 15, line 33), please delete the expression "Available<0" and replace with the expression --Available>0--.

In Claim 29 (at column 15, line 37), please delete the expression "Available<Reserve" and replace with the expression --Available>Reserve--.

In Claim 30 (at column 15, line 42), please delete the expression "Available<0" and replace with the expression --Available>0--.

UNITED STATES PATENT AND TRADEMARK OFFICE
CERTIFICATE OF CORRECTION

PATENT NO.       : 7,295,565 B2
APPLICATION NO. : 10/328470
DATED             : November 13, 2007
INVENTOR(S)       : Ariel Hendel It is certified that error appears in the above-identified patent and that said Letters Patent is hereby corrected as shown below:

In Claim 30 (at column 15, line 44), please delete the expression "Available<Reserve" and replace with the expression --Available>Reserve--.

In Claim 32 (at column 15, line 56), please delete the word "requester" and replace with the word --requestor--.

In Claim 32 (at column 15, line 64), please delete the word "requester" and replace with the word --requestor--.

In Claim 33 (at column 16, line 8), please delete the word "comprises" and replace with the word --comprise--.

In Claim 33 (at column 15, line 12), please delete the word "on" and replace with the word --in--.

In Claim 33 (at column 16, line 15), please delete the word "allocated" and replace with the word --allocable--.

In Claim 33 (at column 16, line 16), please delete the word "queues" and replace with the word --queue--.

In Claim 33 (at column 16, line 17), please delete the word "resources" and "on" and replace with the words --resource-- and --in-- respectively, so that the line reads "resource allocated to other queues in the multiple".

In Claim 37 (at column 16, line 56), please delete the expression "Available<0" and replace with the expression --Available>0--.

In Claim 37 (at column 16, line 58), please delete the expression "Available<Reserve" and replace with the expression --Available>Reserve--.

In Claim 39 (at column 16, line 64), please delete the expression "Available<0" and replace with the expression --Available>0--.

UNITED STATES PATENT AND TRADEMARK OFFICE
CERTIFICATE OF CORRECTION

PATENT NO. : 7,295,565 B2
APPLICATION NO. : 10/328470
DATED : November 13, 2007
INVENTOR(S) : Ariel Hendel It is certified that error appears in the above-identified patent and that said Letters Patent is hereby corrected as shown below:

In Claim 39 (at column 16, line 66), please delete the expression "Available<Reserve" and replace with the expression --Available>Reserve--.

Signed and Sealed this

Twenty-fifth Day of March, 2008

JON W. DUDAS
*Director of the United States Patent and Trademark Office*